United States Patent
Yoon et al.

(10) Patent No.: US 6,515,727 B2
(45) Date of Patent: Feb. 4, 2003

(54) COLOR LCD DEVICE

(75) Inventors: Ki Hyuk Yoon, Seoul (KR); Jang Jin Yoo, Seoul (KR)

(73) Assignee: LG.Philips LCD., Ltd., Seoul (KR)

( * ) Notice: Subject to any disclaimer, the term of this patent is extended or adjusted under 35 U.S.C. 154(b) by 0 days.

(21) Appl. No.: 09/855,032

(22) Filed: May 15, 2001

(65) Prior Publication Data
US 2002/0012084 A1 Jan. 31, 2002

(30) Foreign Application Priority Data
May 24, 2000 (KR) .......................................... 00-28130

(51) Int. Cl.⁷ .......................................... G02F 1/1337
(52) U.S. Cl. .................. 349/143; 349/108; 349/109
(58) Field of Search ................. 349/108, 109, 349/143

(56) References Cited

U.S. PATENT DOCUMENTS

| | | | |
|---|---|---|---|
| 5,309,264 A | 5/1994 | Lien et al. | 359/87 |
| 5,608,556 A | 3/1997 | Koma | 349/143 |
| 5,666,179 A | 9/1997 | Koma | 349/143 |
| 6,100,861 A | * 8/2000 | Cohen et al. | 345/88 |

FOREIGN PATENT DOCUMENTS

| | | |
|---|---|---|
| JP | 8-220511 | 8/1996 |
| JP | 8-220524 | 8/1996 |

OTHER PUBLICATIONS

PCT WO00/55682, Liquid Crystal Display, Taniguchi Y., Sep. 21, 2000.*
K. H. Kim et al., "Domain Divided Vertical Alignment Mode With Optimized Fringe Field Effect," Asia Display 98, pp. 383–386.
V. A. Konovalov et al., "Multi–Domain Vertically Aligned Mode", SID 98 Digest, pp. 1127–1130.

* cited by examiner

Primary Examiner—William L. Sikes
Assistant Examiner—Thoi Van Duong
(74) Attorney, Agent, or Firm—Morgan, Lewis & Bockius LLP

(57) ABSTRACT

Disclosed is a color liquid crystal display device including an upper plate section having color filters, a lower plate section having a patterned electrode structure for each of red, green, and blue pixels, and a liquid crystal interposed between the upper and lower plate sections, wherein the pixels have different electrode widths and different slit widths for different colors, respectively. Respective pixel electrode widths ($E_R$, $E_G$, and $E_B$) associated with the red, green, and blue colors have a relation of "$E_R \leq E_G \leq E_B$", and respective slit widths ($S_R$, $S_G$, and $S_B$) associated with the red, green, and blue colors have a relation of "$S_B \leq S_G \leq S_R$".

18 Claims, 6 Drawing Sheets

OFF(Black)

ON(White)

COLOR LCD DEVICE

BACKGROUND OF THE INVENTION

1. Field of the Invention

The present invention relates to a color liquid crystal display (LCD) device, and more particularly to a color LCD device having different electrode structures for red, green, and blue colors to achieve an improvement in color characteristics for an intermediate color, that is, gray.

2. Description of the Related Art

As well known, liquid crystal is a material exhibiting intermediate characteristics mesophase between solid and liquid. Such liquid crystal has a property for transmitting or shielding light in accordance with an alignment thereof. Accordingly, a desired character or image may be displayed by controlling a liquid crystal, arranged between facing electrodes, to transmit or shield light in accordance with an appropriate adjustment for the arrangement of a particular portion in the liquid crystal conducted based on a variation in the voltage applied to those electrodes. An LCD device is a display device using such a property of liquid crystal. Such an LCD device occupies an important position in the display device field in that it consumes a considerably low power consumption as compared to other devices while being capable of having various sizes from a super-miniature size to a large size and having diverse display patterns.

LCD devices utilize various characteristics to conduct a driving operation in a particular mode for displaying a desired character or image. A mode utilizing birefringence characteristics is known. For the most basic one of modes utilizing birefringence characteristics, an electrically controlled birefringence (ECB) mode is known, in which a liquid crystal controls light using upper and lower electrodes as it is aligned in a horizontal or vertical direction in accordance with a voltage applied thereto.

FIG. 1 is a view illustrating an ECB mode. In FIG. 1, the reference numeral 101 denotes transparent electrodes made of an indium tin oxide (ITO) and adapted to form an electric field in accordance with a voltage applied thereto. Also, the reference numeral 102 denotes glass substrates each adapted to provide a base for the transparent electrodes 101, the reference numeral 103 denotes polarizers for selectively transmitting or shielding light, and the reference numeral 104 denotes a liquid crystal exhibiting electro-optical operation characteristics in accordance with the electric field formed between the transparent electrodes.

For the ECB mode, there are two modes, that is, a vertical alignment (VA) ECB mode in which the state of liquid crystal is changed from a "first state" to a "third state" in accordance with an application of voltage, and a homogeneous ECB mode, in which the state of liquid crystal is changed from the "third state" to the "first state".

Also, there is an LC mode in which the state of liquid crystal is changed between a "first state" and a "second state" in accordance with an application of voltage using a transverse electric field system, as shown in FIG. 2. In FIG. 2, the reference numeral 201a denotes plus (+) (or minus (−)) electrodes, 201b minus (or plus) electrodes, 202 glass substrates, 203 polarizers, and 204 a liquid crystal, respectively.

The basic principle of the LC mode is to adjust light in accordance with an anisotropy in the refractive index of the liquid crystal and an angular relation between the mean direction of the liquid crystal and the direction of each polarizer. The transmittance T in a forward direction in such an LC mode can be expressed as follows:

$$T = \sin^2(2\theta)\sin^2(\delta/2)$$

$$\delta = 2\pi d \, \Delta n_{eff}/\lambda$$

where, "$\theta$" represents the angle between the transmission axis of the polarizer at the side of incident light and the direction of the liquid crystal, "d" represents a cell gap, "$\Delta n_{eff}$" represents an effective refractive index, and "$\lambda$" represents the wavelength of the incident light.

As apparent from the above expressions, it can be found that there may be two modes for adjusting light, that is, a mode for adjusting "$\theta$" (in-plane switching (IPS) mode) and a mode for adjusting "$\delta$" (phase difference) (ECB mode). In the ECB mode for adjusting "$\delta$" (phase difference) (normally, "$\theta$" is 45°), the phase difference $\delta$ is varied as "$\Delta n_{eff}$" varies in accordance with an application of voltage to the liquid crystal. In this case, the variation in the phase difference $\delta$ is differently exhibited at different wavelengths, respectively. In particular, a considerable color characteristic difference is exhibited at a wavelength corresponding to gray. FIG. 3 illustrates respective variations in transmittance depending on the voltage applied in the VA-ECB mode at different wavelengths.

In order to compensate for the color characteristic difference exhibited at the wavelength corresponding to gray, as shown in FIG. 3, a scheme has been proposed in which different cell gaps are used for different colors to achieve an improvement in color characteristics. This scheme is illustrated in FIG. 4.

In FIG. 4, the reference numeral 401 denotes a common electrode, 402 color filters, and 403 black matrices, respectively. The black matrices 403 are formed at boundaries of pixels to prevent a color diffusion. These black matrices 403 serve to suppress an interference effect exhibited among neighboring colors, thereby keeping the purity of each color. In FIG. 4, the reference numerals 404 and 407 denote glass substrates, and the reference numerals 405 and 408 denote polarizers, respectively. Also, the reference numeral 406 denotes pixel electrodes respectively corresponding to red, green and blue colors, and the reference numeral 409 denotes a liquid crystal.

However, this method, in which different cell gaps are used for different colors respectively, has a problem associated with manufacturing processes. For example, where color filters are designed to have different thicknesses for different colors, respectively, it is necessary to change the characteristics of materials used in order to compensate for absolute transmittances thereof. Furthermore, it is difficult to secure a desired uniformity of cell gaps. It is also difficult to secure a desired alignment uniformity of the liquid crystal during a rubbing process. As a result, the above mentioned method has a problem in that it is difficult to secure a desired yield of the LCD process.

A lateral field induced (LFI) VA mode is also known as a mode applying the birefringence mode. For this mode, a common electrode area patterned electrode structures are provided on an upper plate and a lower plate, respectively, as shown in FIGS. 5A and 5B. The upper plate has a structure rubbed in a slit direction. In FIGS. 5A and 5B, the reference numeral 501 denotes an ITO electrode, 502 glass substrates, 503 polarizers, and 504 a liquid crystal.

In the LFI-VA mode, the alignment of the liquid crystal 504 is substantially vertical when no voltage is applied, thereby preventing light from passing through the liquid crystal. When a voltage is applied, a multi-domain structure is formed in accordance with a combined function of a transverse electric field and a vertical electric field formed by the electrode structure of the lower plate 502. The simplest diagram of this structure is illustrated in FIG. 5C. FIG. 5C schematically illustrates the mean direction of the liquid crystal exhibited at the front side when a voltage is applied in the LFI-VA mode.

In this structure, the direction of the liquid crystal at the boundary of each lower plate electrode and an associated slit is slightly twisted in accordance with an application of voltage. Also, domains arranged at both sides of each electrode exhibit different ECB characteristics in that they have different 90° viewing angle directions, respectively. Referring to FIG. 6, it can be found that the variation in transmittance characteristics exhibited in accordance with a variation in voltage is differently exhibited at different wavelengths, respectively. This means that there is a problem associated with a variation in color characteristics for gray.

SUMMARY OF THE INVENTION

Therefore, an object of the invention is to provide a color LCD device having different electrode structures for different colors to achieve an improvement in color characteristics for an intermediate color, that is, gray.

In accordance with the present invention, this object is accomplished by providing a color liquid crystal display device including an upper plate section having a common electrode, color filters, a glass substrate, and a polarizer, a lower plate section having a glass substrate and pixel electrodes, and a liquid crystal interposed between the upper and lower plate sections, wherein the pixel electrodes have different widths for different colors, respectively, and adjacent ones of the pixel electrodes have different slit widths for different colors, respectively.

Since the color LCD device uses different pixel electrode widths and different slit widths in association with color filters of different colors, respectively, there is an advantage in that the color characteristics of the color LCD device is improved where the color LCD device is designed using a pixel electrode pattern for an LFI-VA mode or an IPS mode.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Now, the present invention will be described in detail with reference to embodiments illustrated in the appended drawings.

Figure 1:
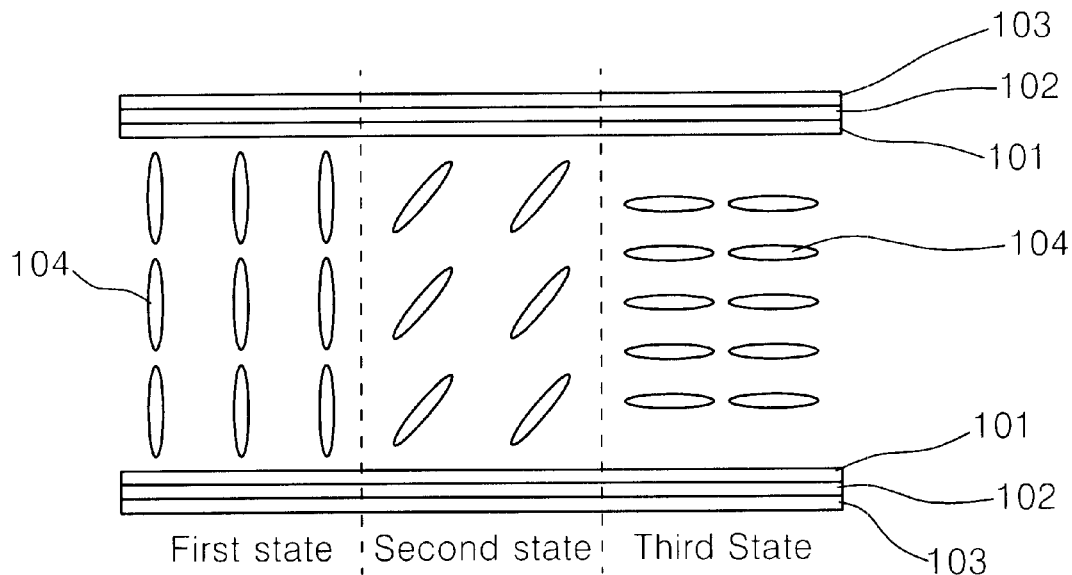
FIG. 1 is a schematic view illustrating the operation principle of an LCD device according to a general ECB mode.
Figure 2:
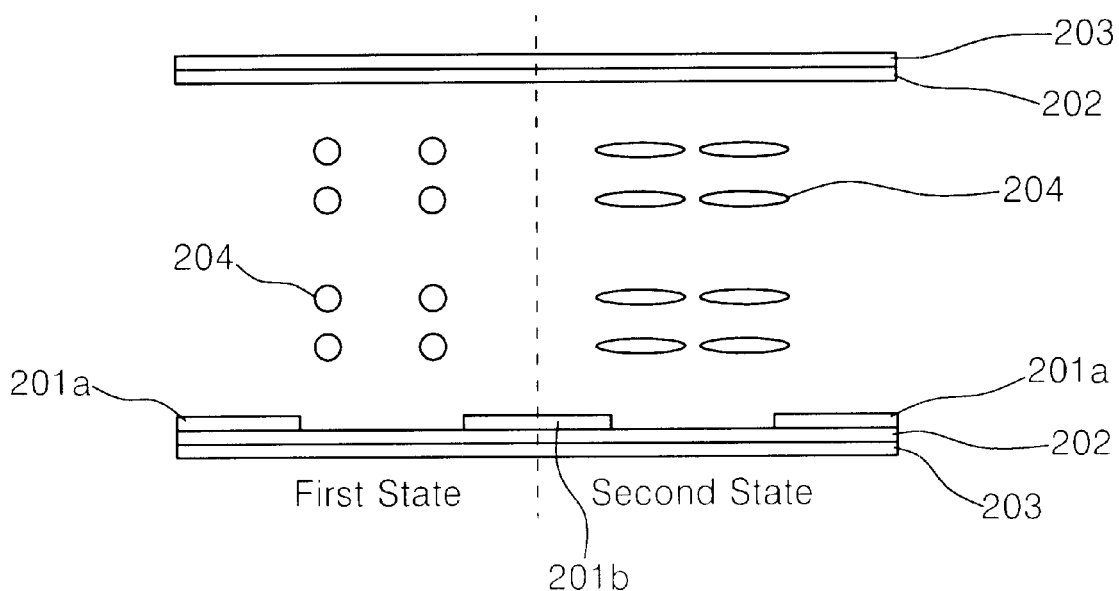
FIG. 2 is a schematic view illustrating the operation principle of an LCD device according to a general IPS mode.
Figure 3:
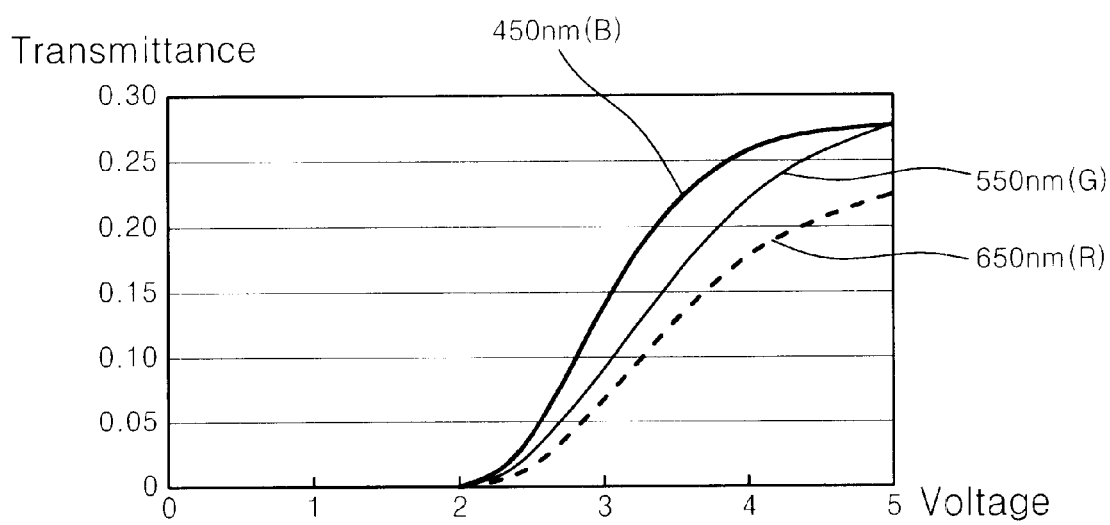
FIG. 3 is a graph illustrating respective variations in transmittance depending on the voltage applied in a VA-ECB mode at different wavelengths.
Figure 4:
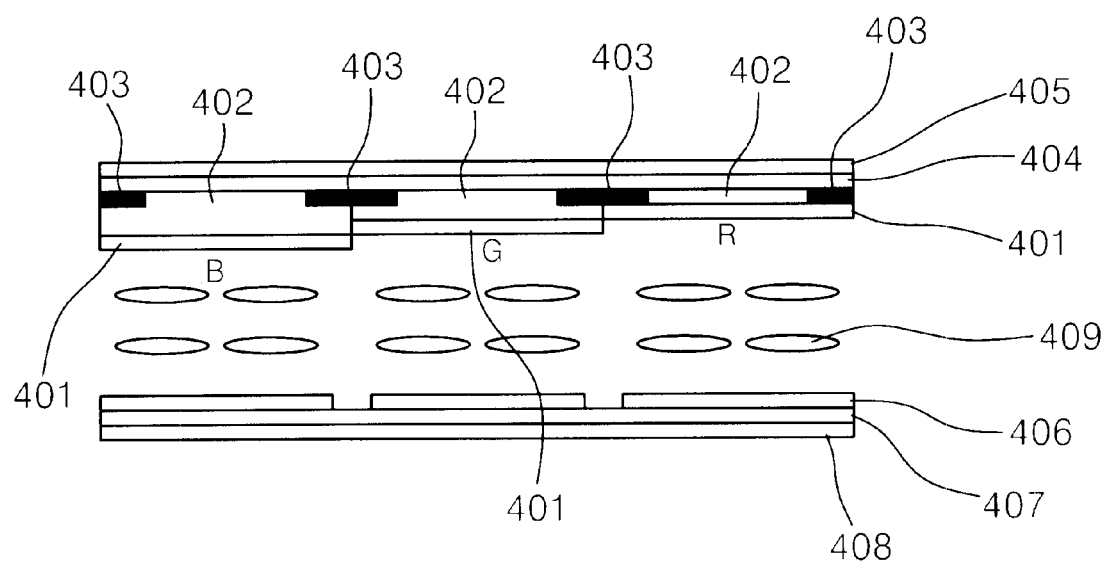
FIG. 4 is a schematic view illustrating a scheme for improving color characteristics in the general LCD device according to the general ECB mode, based on a compensation for a cell gap.
Figure 5A:
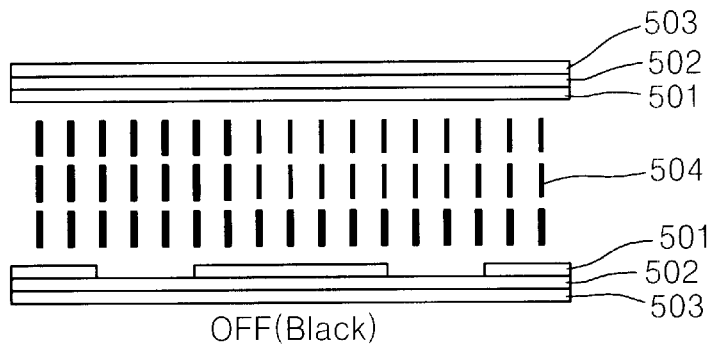
FIGS. 5A and 5B are schematic views respectively illustrating the operation principle of an LCD device according to a general LFI-VA mode.
Figure 5B:
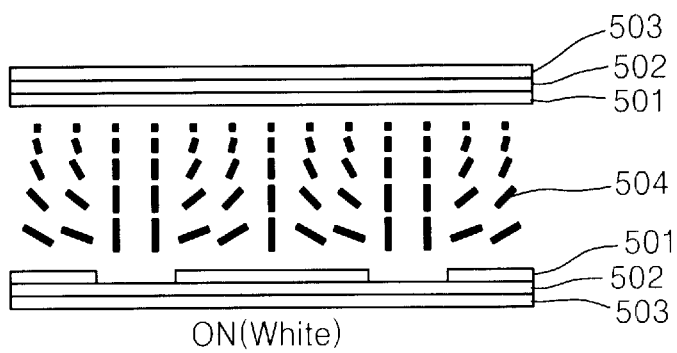
Figure 5C:
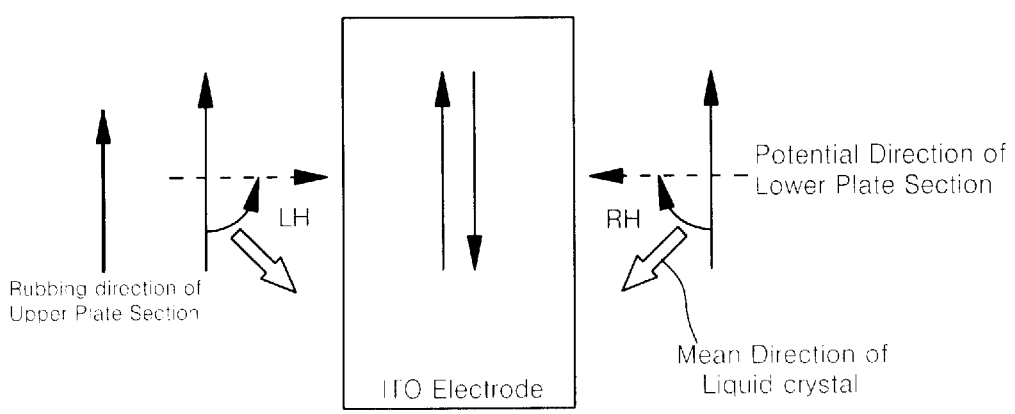
FIG. 5C is a schematic view illustrating the mean direction of a liquid crystal exhibited when a voltage is applied in the color LCD device according to the general LFI-VA mode.
Figure 6:
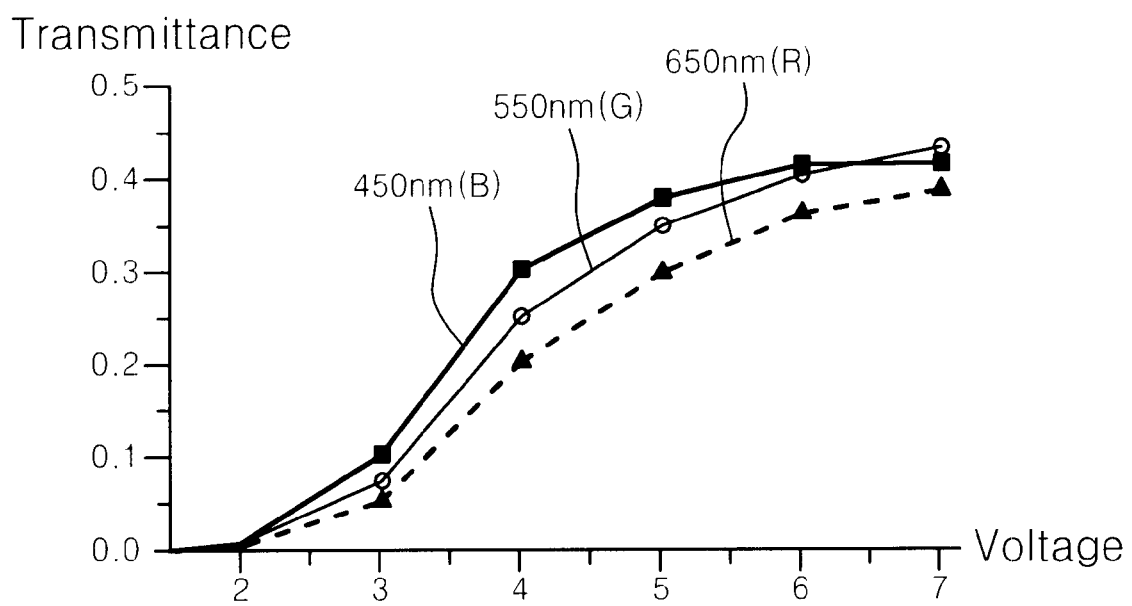
FIG. 6 is a graph illustrating respective variations in transmittance depending on the voltage applied in the general LFI-VA mode at different wavelengths.
Figure 7A:
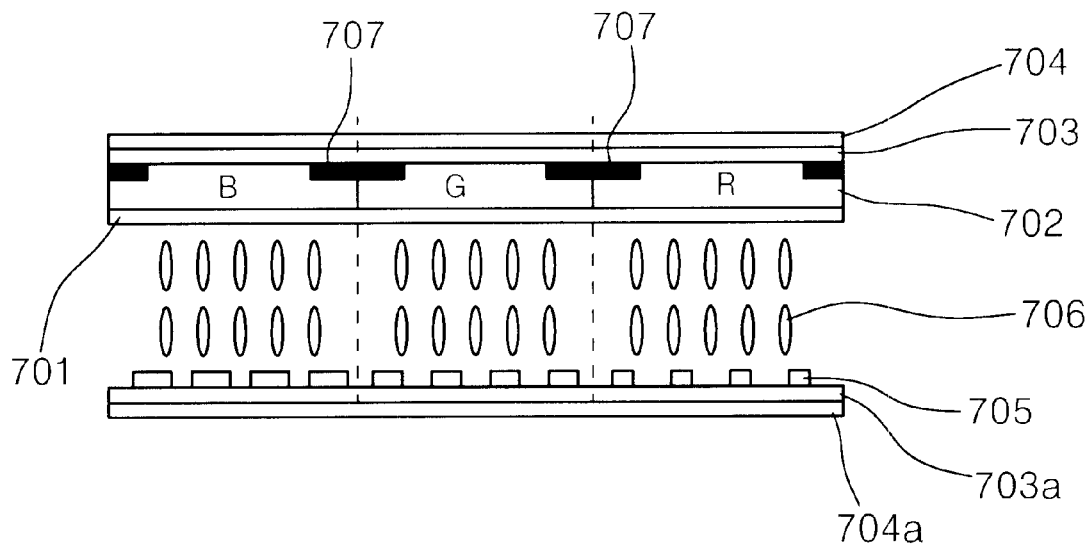
FIG. 7A is a sectional view illustrating a color LCD device according to a first embodiment of the present invention.
Figure 7B:
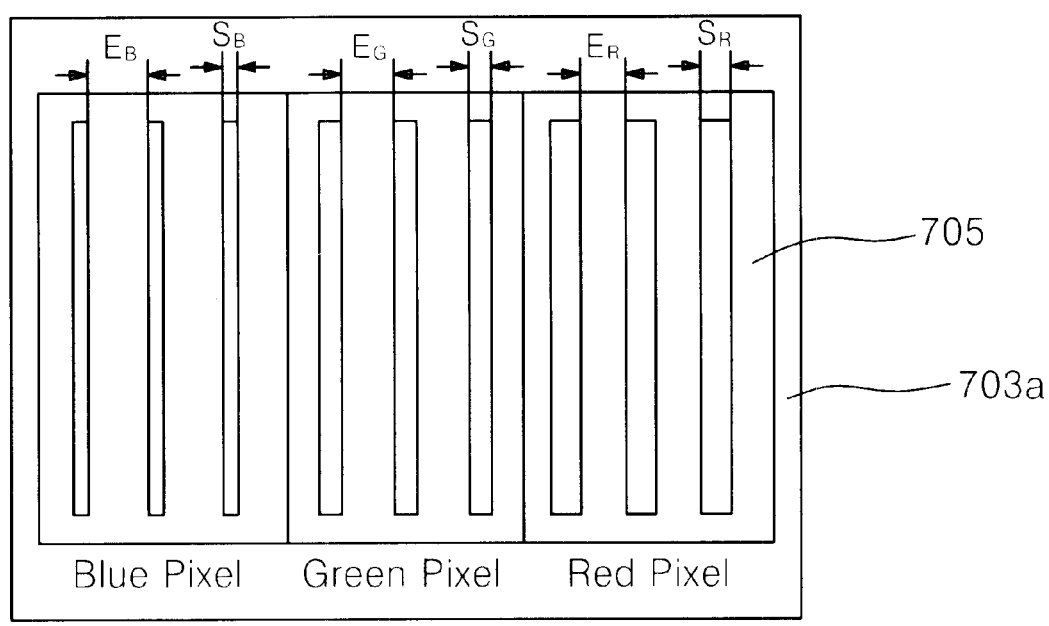
FIG. 7B is a plan view illustrating a lower plate included in the color LCD device of FIG. 7A.

FIGS. 7A and 7B illustrate a color LCD device according to a first embodiment of the present invention. FIG. 7A is a sectional view illustrating the color LCD device whereas FIG. 7B is a plan view illustrating a lower plate included in the color LCD device.

The color LCD device according to the first embodiment is an LFI-VA mode LCD device. As shown in FIGS. 7A and 7B, this color LCD device includes an upper plate having a laminated structure including a common electrode 701 for forming an electric field in accordance with an application of voltage, color filters 702 each adapted to allow light of a particular wavelength corresponding to an associated color, a glass plate 703 adapted to provide a base for forming and electrode, and a polarizer 704 for selectively transmitting or shielding light. The color LCD device also includes a lower plate spaced apart from the upper plate by a desired distance. The lower plate includes a polarizer 704a, a glass substrate 703a, and pixel electrodes 705 formed on the glass substrate 703a while corresponding to red, green, and blue colors, respectively. The color LCD device also includes a liquid crystal 706 filled in a space defined between the upper and lower plates. In FIGS. 7A and 7B, the reference numeral 707 denotes black matrices.

The pixel electrodes 705 provided for respective colors have different widths for respective colors in accordance with the present invention. Also, the slit width between the pixel electrodes in each pixel is different from those of different colors.

That is, where it is assumed that respective widths of the pixel electrodes 705 corresponding to red, green, blue colors are represented by $E_R$, $E_G$, and $E_B$, it is preferable that those pixel electrodes 705 are formed to have a relation of "$E_R \leq E_G \leq E_B$". Where it is also assumed that respective slit widths of pixel electrodes associated with red, green, and blue colors are represented by $S_R$, $S_G$, and $S_B$, it is preferable that those slit widths are determined to have a relation of "$S_B \leq S_G \leq S_R$".

Figure 8:
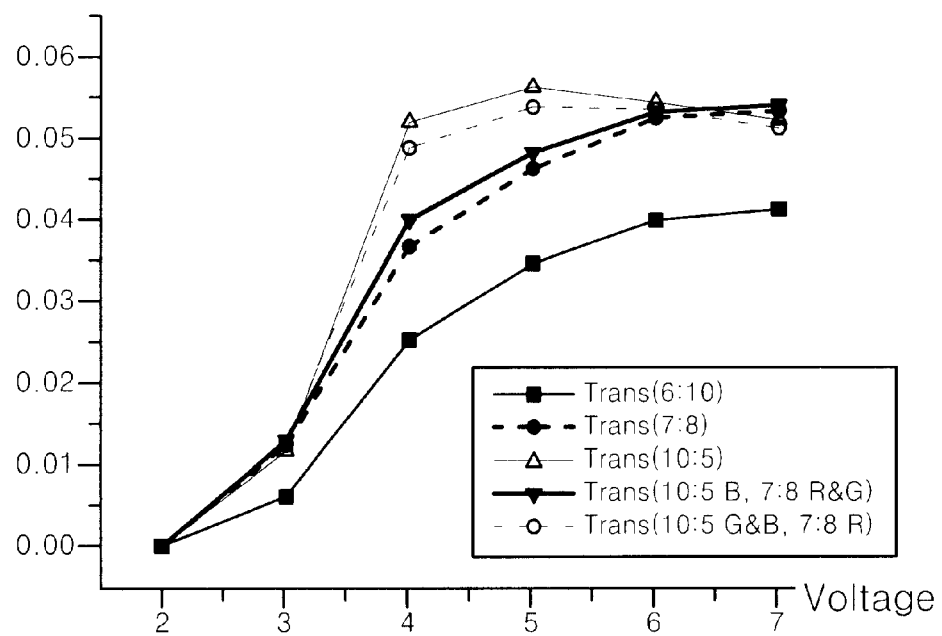
FIG. 8 is a graph illustrating respective variations in transmittance depending on the voltage applied in the color LCD according to the first embodiment of the present invention at different wavelengths.

In the color LCD device having the above mentioned structure according to the first embodiment of the present invention, its light transmittance is sharply increased as the electrode width increases, as compared to the silt width, and consequently saturated, as shown in FIG. 8.

Referring to such characteristics, it can be found that the transmittance of blue (B) pixels should be higher than those of green (G) and red (R) pixels at the same voltage. Taking into consideration this fact, the design of the electrode structure according to the first embodiment is made.

Generally, brightness depends on the voltage characteristics of green color because the green color exhibits best visibility characteristics. However, there are differences in color characteristics among different colors. For example, when experiments were made for the case in which red, green and blue pixels are designed to have the same electrode/slit width ratio of 7:8 and the case in which the blue pixel is designed to have an electrode/slit width ratio of 10:5 whereas the red and green pixels are designed to have an electrode/slit width ratio of 7:8, the electrode structure having the electrode/slit width ratio of 7:8 for all the red, green and blue pixels exhibited a color difference of 0.0661. In this case, the electrode structure modified to have an electrode/slit width ratio of 10:5 for the blue pixel exhibited a color difference of 0.0443. That is, the modified electrode structure of the latter case exhibited an improvement in color characteristics by about 33%. Where experiments were made for the case in which red, green and blue pixels are designed to have the same electrode/slit width ratio of 10:5 and the case in which the green and blue pixels are designed to have an electrode/slit width ratio of 10:5 whereas the red pixel is designed to have an electrode/slit width ratio of 7:8, the electrode structure having the electrode/slit width ratio of 10:5 for all the red, green and blue pixels exhibited a color difference of 0.0541. In this case, the electrode structure modified to have an electrode/slit width ratio of 7:8 for the red pixel exhibited a color difference of 0.0312. That is, the modified electrode structure of the latter case exhibited an improvement in color characteristics by about 42%.

Figure 9:
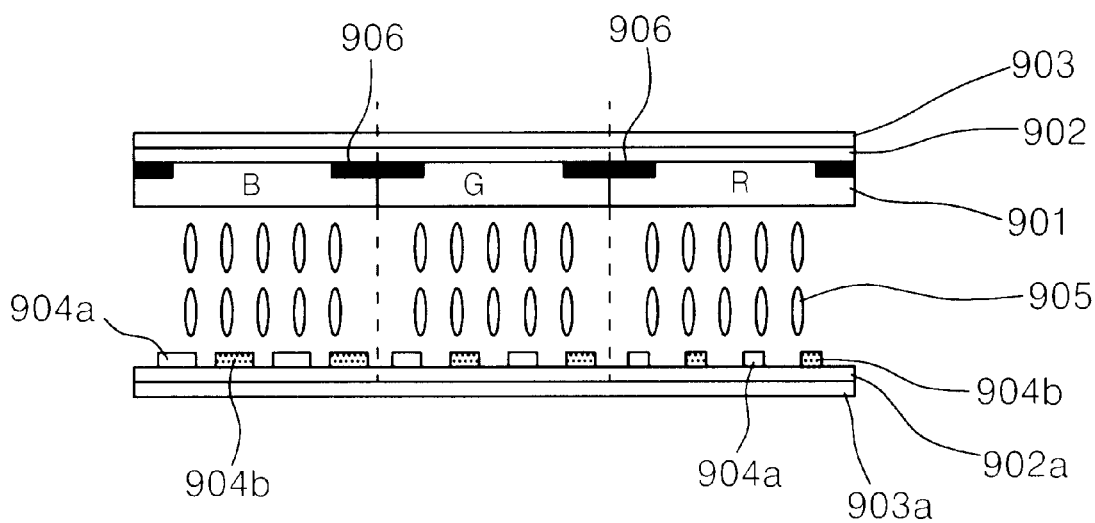
FIG. 9 is a sectional view illustrating a color LCD device according to a second embodiment of the present invention.

Meanwhile, FIG. 9 illustrate a color LCD device according to a second embodiment of the present invention.

The color LCD device according to the second embodiment is an IPS mode LCD device. As shown in FIG. 9, this color LCD device includes an upper plate having a laminated structure including color filters 901 each adapted to allow light of a particular wavelength corresponding to an associated color, a glass plate 902, and a polarizer 903 for selectively transmitting or shielding light. The color LCD device also includes a lower plate spaced apart from the upper plate by a desired distance. The lower plate includes a polarizer 903a, a glass substrate 902a, and pixel electrodes 904a and 904b formed, as an anode and a cathode, on the glass substrate 902a for each of red, green, and blue colors. The color LCD device also includes a liquid crystal 905 filled in a space defined between the upper and lower plates. In FIG. 9, the reference numeral 906 denotes black matrices.

The pixel electrodes 904a and 904b provided for respective colors have different widths for respective colors, as in the first embodiment. Also, the slit width between the pixel electrodes in each pixel is different from those of different colors.

In the color LCD device according to the second embodiment of the present invention, it is possible to achieve an improvement in color characteristics by appropriately selecting desired electrode widths and desired slit widths, as in the first embodiment.

As apparent from the above description, the present invention provides a color LCD device using different pixel electrode widths and different slit widths in association with color filters of different colors, respectively, as compared to conventional cases. Accordingly, where the color LCD device is designed using a pixel electrode pattern for an LFI-VA mode or an IPS mode, there is an advantage in that the color characteristics of the color LCD device is improved.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A color liquid crystal display device including an upper plate section having a common electrode, color filters, a glass substrate, and a polarizer, a lower plate section having a glass substrate and pixel electrodes, and a liquid crystal interposed between the upper and lower plate sections, wherein the pixel electrodes have different widths for different colors, respectively, and adjacent ones of the pixel electrodes have different slit widths for different colors, respectively.

2. The color liquid crystal display device according to claim 1, wherein the pixel electrodes have the same width for the same color, and the adjacent ones of the pixel electrodes have the same slit width for the same color.

3. The color liquid crystal display device according to claim 1, wherein when the pixel electrode s correspond to pixels of red, green, and blue colors, respectively, the ratio between the pixel electrode width and the slit width (pixel electrode width:slit width) for each of the red, green, and blue colors is selected to be different from those for the remaining ones of the red, green, and blue colors.

4. The color liquid crystal display device according to claim 1, wherein when the pixel electrodes correspond to pixels of red (R), green (G), and blue (B) colors, respectively, respective pixel electrode widths ($E_R$, $E_G$, and $E_B$) associated with the red, green, and blue colors have a relation of "$E_R \leq E_G \leq E_B$".

5. The color liquid crystal display device according to claim 1, wherein when the pixel electrodes correspond to pixels of red (R), green (G), and blue (B) colors, respectively, respective slit widths ($S_R$, $S_G$, and $S_B$) associated with the red, green, and blue colors have a relation of "$S_B \leq S_G \leq S_R$".

6. The color liquid crystal display device according to claim 1, wherein when the pixel electrodes correspond to pixels of red (R), green (G), and blue (B) colors, respectively, respective pixel electrode widths ($E_R$, $E_G$, and $E_B$) and respective slit widths ($S_R$, $S_G$, and $S_B$) associated with the red, green, and blue colors are determined to have relations of "$E_B:S_B \neq E_R:S_R$", "$E_B:S_B \neq E_G:S_G$", and "$E_R:S_R = E_G:S_G$".

7. The color liquid crystal display device according to claim 1, wherein when the pixel electrodes correspond to pixels of red (R), green (G), and blue (B) colors, respectively, respective pixel electrode widths ($E_R$, $E_G$, and $E_B$) and respective slit widths ($S_R$, $S_G$, and $S_B$) associated with the red, green, and blue colors are determined to have relations of "$E_R: S_R \neq E_G:S_G$", "$E_R:S_R \neq E_B: S_B$", and "$E_G:S_G = E_B:S_B$".

8. A color liquid crystal display device including an upper plate section having color filters, a glass substrate, and a polarizer, a lower plate section having a polarizer, a glass substrate and pixel electrodes, and a liquid crystal interposed between the upper and lower plate sections, wherein the pixel electrodes have different widths for different colors, respectively, and adjacent ones of the pixel electrodes have different slit widths for different colors, respectively.

9. The color liquid crystal display device according to claim 8, wherein the pixel electrodes have the same width for the same color, and the adjacent ones of the pixel electrodes have the same slit width for the same color.

10. The color liquid crystal display device according to claim 8, wherein when the pixel electrodes correspond to pixels of red, green, and blue colors, respectively, the ratio between the pixel electrode width and the slit width (pixel electrode width:slit width) for each of the red, green, and blue colors is selected to be different from those for the remaining ones of the red, green, and blue colors.

11. The color liquid crystal display device according to claim 8, wherein when the pixel electrodes correspond to pixels of red (R), green (G), and blue (B) colors, respectively, respective pixel electrode widths ($E_R$, $E_G$, and $E_B$) associated with the red, green, and blue colors have a relation of "$E_R \leq E_G \leq E_B$".

12. The color liquid crystal display device according to claim 8, wherein when the pixel electrodes correspond to pixels of red (R), green (G), and blue (B) colors, respectively, respective slit widths ($S_R$, $S_G$, and $S_B$) associated with the red, green, and blue colors have a relation of "$S_B \leq S_G \leq S_R$".

13. The color liquid crystal display device according to claim 8, wherein when the pixel electrodes correspond to pixels of red (R), green (G), and blue (B) colors, respectively, respective pixel electrode widths ($E_R$, $E_G$, and $E_B$) and respective slit widths ($S_R$, $S_G$, and $S_B$) associated with the red, green, and blue colors are determined to have relations of "$E_B:S_B \neq E_R:S_R$", "$E_B:S_B \neq E_G:S_G$", and "$E_R:S_R = E_G:S_G$".

14. The color liquid crystal display device according to claim 8, wherein when the pixel electrodes correspond to pixels of red (R), green (G), and blue (B) colors, respectively, respective pixel electrode widths ($E_R$, $E_G$, and $E_B$) and respective slit widths ($S_R$, $S_G$, and $S_B$) associated with the red, green, and blue colors are determined to have relations of "$E_R:S_R \neq E_G:S_G$", "$E_R:S_R \neq E_B:S_B$", and "$E_G:S_G = E_B:S_B$".

15. A color liquid crystal display device including an upper plate section having color filters, a lower plate section having a patterned electrode structure for each of red, green, and blue pixels, and a liquid crystal interposed between the upper and lower plate sections, wherein the pixels have different electrode widths and different slit widths for different colors, respectively.

16. The color liquid crystal display device according to claim 15, wherein when the pixels have pixel electrodes corresponding to red, green, and blue colors, respectively, the ratio between the pixel electrode width and the slit width (pixel electrode width:slit width) for each of the red, green, and blue colors is selected to be different from those for the remaining ones of the red, green, and blue colors.

17. The color liquid crystal display device according to claim 15, wherein when the pixels have pixel electrodes corresponding to red, green, and blue colors, respectively, respective pixel electrode widths ($E_R$, $E_G$, and $E_B$) and respective slit widths ($S_R$, $S_G$, and $S_B$) associated with the red, green, and blue colors are determined to have relations of "$E_B:S_B \neq E_R:S_R$", "$E_B:S_B \neq E_G:S_G$", and "$E_R:S_R = E_G:S_G$".

18. The color liquid crystal display device according to claim 15, wherein when the pixels have pixel electrodes corresponding to red, green, and blue colors, respectively, respective pixel electrode widths ($E_R$, $E_G$, and $E_B$) and respective slit widths ($S_R$, $S_G$, and $S_B$ associated with the red, green, and blue colors are determined to have relations of "$E_R:S_R \neq E_G:S_G$", "$E_R:S_R \neq E_B:S_B$", and "$E_G:S_G = E_B:S_B$".

* * * * *